United States Patent [19]

Cox et al.

[11] Patent Number: 5,364,935
[45] Date of Patent: Nov. 15, 1994

[54] CONTINUOUS HYDROLYSIS OF CELLULOSE ACETATE

[75] Inventors: Mark K. Cox; Tim J. Frederick, both of Kingsport, Tenn.

[73] Assignee: Eastman Chemical Company, Kingsport, Tenn.

[21] Appl. No.: 51,435

[22] Filed: Apr. 23, 1993

Related U.S. Application Data

[63] Continuation-in-part of Ser. No. 820,742, Jan. 13, 1992, abandoned.

[51] Int. Cl.$^5$ .................... C08B 3/06; C08B 1/02; C08B 3/22
[52] U.S. Cl. .................... 536/69; 536/71; 536/76; 536/124; 536/127
[58] Field of Search .................... 536/69, 71, 76, 124, 536/127

[56] References Cited

U.S. PATENT DOCUMENTS

| | | | |
|---|---|---|---|
| 1,961,251 | 6/1934 | Sease | 536/69 |
| 2,126,489 | 8/1938 | Malm | 536/69 |
| 2,790,796 | 4/1957 | Robin et al. | |
| 3,767,642 | 10/1973 | Campbell et al. | |
| 4,016,353 | 4/1977 | Goheen et al. | 536/69 |
| 4,663,447 | 5/1987 | Yamazaki et al. | 536/76 |

FOREIGN PATENT DOCUMENTS

| | | | |
|---|---|---|---|
| 530164 | 9/1956 | Canada | 536/69 |
| 292398 | 6/1928 | United Kingdom | |

OTHER PUBLICATIONS

Journal of Polymer Science, vol. X, No. 4, Mar. 1952, L. A. Hiller, "The Reaction of Cellulose Acetate With Acetic Acid & Water", p. 385, 1st paragraph; p. 389, table I; pp. 390–391.
WO, A1, 9213893 (Eastman Kodak Company), 20 Aug. 1992 (20.08.92), claims 1, 5, 6, abstract, example 3.
WO, A1, 9116358 (Eastman Kodak Company), 31 Oct. 1991 (31.10.91), p. 6, line 24–line 28; p. 7, line 11–line 25, claims 1, 6, 10.
Chem. Eng. Comm., vol. 36, pp. 251–267.

*Primary Examiner*—Nathan M. Nutter
*Attorney, Agent, or Firm*—Charles R. Martin

[57] ABSTRACT

Disclosed is a process comprising continuously flowing a composition through a hydrolysis zone so as to achieve a residence time distribution such that at least 81% of the area under the residence time distribution curve is within plus or minus 50% of the mean residence time. The composition comprises cellulose triacetate in the range of 5 to 30%, water in the range of 4 to 25%, and acetic acid in the range of 45 to 91%.

3 Claims, 7 Drawing Sheets

CONTINUOUS HYDROLYSIS OF CELLULOSE ACETATE

This application is a continuation-in-part of Ser. No. 07/820,742 filed Jan. 13, 1992 and now abandoned.

This invention pertains to a process for reducing the number of insoluble masses which precipitate out of a solution of cellulose acetate and acetone. The process involves establishing a flow pattern in a continuous hydrolysis reactor wherein the radial gradient in velocity is very small.

Cellulose esters are well known polymers which are commercial prepared in a multi-step process. The basic steps required for the manufacture of cellulose diacetate from cellulose are activation, acetylation, hydrolysis and product recovery. In the activation step cellulose is contacted with acetic acid to prepare the cellulose for further processing. In the acetylation step acetic anhydride is reacted with the activated cellulose under the influence of a mineral acid catalyst to add three acetyl groups to each cellulose ring so as to form cellulose triacetate. In the hydrolysis step the cellulose triacetate is hydrolyzed to remove enough of the acetyl groups to result in an average number of acetyl groups per ring of about 2.4. This product is often referred to as simply cellulose acetate. Finally, the cellulose acetate is recovered by mixing the hydrolyzed composition with water, dewatering the cellulose acetate which precipitates out and drying the dewatered cellulose acetate.

The requirement that the cellulose acetate have an average of 2.4 acetyl groups per ring results from the manner in which the cellulose acetate is principally used. The principal use of cellulose acetate is to prepare fibers by solvent spinning techniques wherein the cellulose acetate is dissolved in acetone, the acetone solution is extruded through a spinnerette to form fibers, the fibers are collected and further processed and the acetone is recovered and recycled. When there are three acetyl groups per ring or when there are only two groups per ring the cellulose acetate is substantially insoluble in acetone. However, there is a range of acetyl substitution between these two extremes wherein cellulose acetate is substantially completely soluble in acetone. The average of this solubility range is about 2.4. Thus, in order to maximize the solubility of cellulose acetate in acetone and facilitate solvent spinning of the cellulose acetate into fibers the average number of acetyl groups per ring should be around 2.4. The average number of acetyl groups per cellulose acetate ring is often referred to as the degree of substitution.

The requirement that the average number of acetyl groups per ring be about 2.4 is significant with regard to both the total mass of cellulose acetate being hydrolyzed as well as each portion of the total mass. Obviously, the average of the entire mass must be about 2.4 for desired solubility but unless the average within each and every portion of the total mass is also about 2.4 that portion of the total mass will be insoluble and will precipitate out as an insoluble discrete mass. To state the situation another way, even though the average of an entire mass of cellulose acetate undergoing hydrolysis is about 2.4, if there are portions within this mass wherein the average within the portion is too far above or below 2.4 these portions will be insoluble and will precipitate out as discrete masses. To be more precise, whether a portion which has an average of about 2.4 will precipitate depends on the relative size of the portion compared to the total mass of cellulose acetate. For example, if the entire mass of cellulose acetate is composed of only several portions there could be regions within the portion wherein the average is sufficiently above or below 2.4 to cause these regions of the portion to precipitate. Conversely, if the entire mass of cellulose acetate is composed of a multiplicity of extremely small portions there will be few if any regions of the portion which precipitate.

The precipitation of these discrete masses from the spinning solution is one of the most difficult problems that must be dealt with in the commercial production of cellulose acetate fibers because the precipitated masses fail to pass through the holes in the spinnerette and therefore obstruct the holes in the spinnerette and disrupt the spinning process. Since these precipitated masses are enormously disruptive to the spinning process, to the extent it is possible, they must be removed from the process. If the precipitated mass is fairly large, it must be either mechanically or chemically removed. If the precipitated mass is small, it is difficult to remove from the process by any means, including filtration.

Although the hydrolysis step can be conducted either on a batch basis or a continuous basis, preferable it is conducted on a continuous basis. Not only are the capital costs more favorable for a continuous process, if the remainder of the process is a continuous process a continuous hydrolysis step more clearly matches the remainder of the process.

Even though the continuous hydrolysis steps known in the prior art are preferable in comparison to the batch hydrolysis steps of the prior art, the continuous process inherently results in portions of the total mass of cellulose acetate which have an average of acetyl groups within the portion which is sufficiently above or below the average of 2.4 to cause these portions to be insoluble and precipitate out as discrete masses. The reason for this phenomenon is that all continuous hydrolysis processes of the prior art involve in some way or other the flow of cellulose acetate through a conduit and the flow of cellulose acetate in a conduit inherently creates a wide range of acetyl spread because of the variation in the velocity of a fluid moving through a conduit. Even though the flow of cellulose acetate in a typical hydrolysis reactor may not always be absolutely Newtonian, the flow pattern in a typical hydrolysis reactor can be conceptualized as in the nature of a Newtonian fluid passing through a conduit.

BRIEF DESCRIPTION OF THE DRAWINGS

The process of this invention can be better understood by a consideration of the Figures.

FIG. 2 is a plot of the percent flow versus the degree of substitution and depicts the distribution of acetyl substitution. Curve A in FIG. 2 illustrates a typical curve for a composition exiting a hydrolysis reactor wherein there is Newtonian type flow. As will be discussed subsequently, cellulose acetate is only soluble in acetone within a narrow range of a degree of substitution, which is about 2.1 to 2.7. These limits are illustrated in FIG. 2. Thus, the areas under the distribution curve which are located above and below the solubility limits for cellulose acetate in acetone, which are illustrated as areas 1 and 2, are associated with portions of the cellulose acetate mass wherein the average acetyl group substitution within the portion is above or below the solubility limits in acetone and these portions precipitate from the process as insoluble masses.

FIG. 3 is a plot of residence time versus percent flow. Curve A represents the situation where a fluid portion near the wall resides in the conduit for a substantially longer period of time that a portion in the center of the conduit and the residence time distribution will be fairly wide. In contrast to a wide residence time distribution curve, illustrated by curve A, a narrower or "curve" curve, illustrated by curve B, illustrates the situation where there is a reduction in the amount of cellulose acetate that is above and below the ranges of acetone solubility.

In FIG. 5, the mean residence time has been identified as A and the residence time has been plotted versus the percent flow to develop residence time distribution curve C. In accordance with the process of this invention, the composition flowing through the hydrolysis reactor achieves a residence time distribution such that 81%, preferably 90% and more preferably 95%, of the area under the residence time distribution curve is within plus or minus 50% of the mean residence time. The area under curve C which is associated with plus or minus 50% of this value has been identified as B.

Returning to a consideration of the flow of cellulose acetate in a typical hydrolysis reactor, the flow may not always be absolutely Newtonian but the flow pattern in a typical hydrolysis reactor can be conceptualized as in the nature of a Newtonian fluid passing through a conduit. As an obvious consequence of this distribution of velocities the various portions of cellulose acetate distributed along the diameter of the conduit remain in the hydrolysis reactor for varying periods of time. For example, the portions which are near the center of the reactor are moving at a greater velocity that those portions which are closer to the conduit wall and spend less time in the hydrolysis reactor. Similarly, the portions which are located closer to the conduit wall have a slower velocity and will remain in the hydrolysis reactor for a longer period of time. The period of time a portion remains in the hydrolysis reactor is often referred to as the residence time. Because hydrolysis is not related to the velocity of the portion and proceeds at this same rate for all portions, the extent to which the portion is hydrolyzed is entirely a function of the period of time the portion remains in the hydrolysis reactor, which is often referred to as residence time. Thus, the portions which are located near the center of the conduit will become less hydrolyzed than the portions which are located near the wall of the conduit and the portions which are near the wall of the conduit will become more hydrolyzed than the portions which are located near the center of the conduit. The result is that a typical flow pattern produces a range of average acetyl substitution within the various portions across the cross section of cellulose acetate which exits from the hydrolysis reactor.

Figure 2:
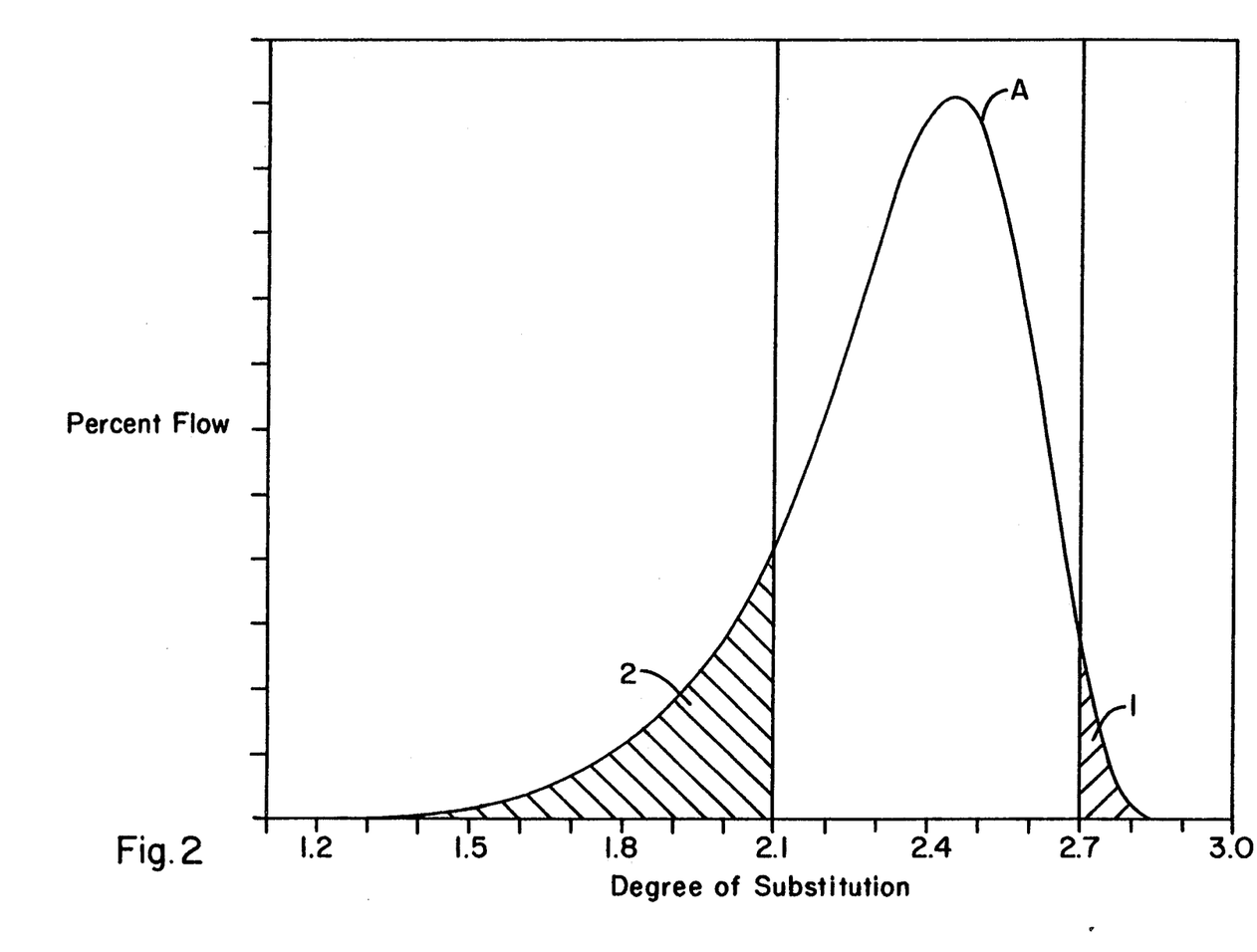

As shown in FIG. 2, the distribution of acetyl substitution can be conveniently expressed by plotting the percent flow exiting the hydrolysis reactor versus the degree of substitution. Curve A in FIG. 2, illustrates a typical curve for a composition exiting a hydrolysis reactor wherein there is Newtonian type flow. As discussed earlier, cellulose acetate is only soluble in acetone within a narrow range of a degree of substitution, which is about 2.1 to 2.7. These limits are illustrated in FIG. 2. Thus, the areas under the distribution curve which are located above and below the solubility limits for cellulose acetate in acetone, which are illustrated as areas 1 and 2, are associated with portions of the cellulose acetate mass wherein the average acetyl group substitution within the portion is above or below the solubility limits in acetone and these portions precipitate from the process as insoluble masses.

Since the degree of substitution within each portion of the mass of cellulose acetate is in direct proportion to the residence time of the portion in the hydrolysis reactor, the change in the degree of substitution can also be measured by the relationship between the percent flow of material exiting the hydrolysis reactor and the time which the portion was in the reactor or residence time.

In measuring the degree of substitution using this correlation the following definitions are applicable.

Percent flow is defined as 100 times the volume of all portions of the mass of cellulose acetate which have the same degree of substitution divided the total volume of all portions of cellulose acetate.

Residence time is defined as the period of time a portion of cellulose acetate is in the hydrolysis reactor. Thus, shorter values of residence time correspond to portions which are located more in the center of the conduit and are moving at a faster velocity and longer values of residence time correspond to portions which are located nearer the wall of the conduit and are moving at a slower velocity. As will be understood by those skilled in the art, masses of cellulose acetate having the same degree of substitution will necessarily have the same residence time.

Residence time distribution is defined as the distribution of the residence times of the various portions of the mass of cellulose acetate.

Figure 1:
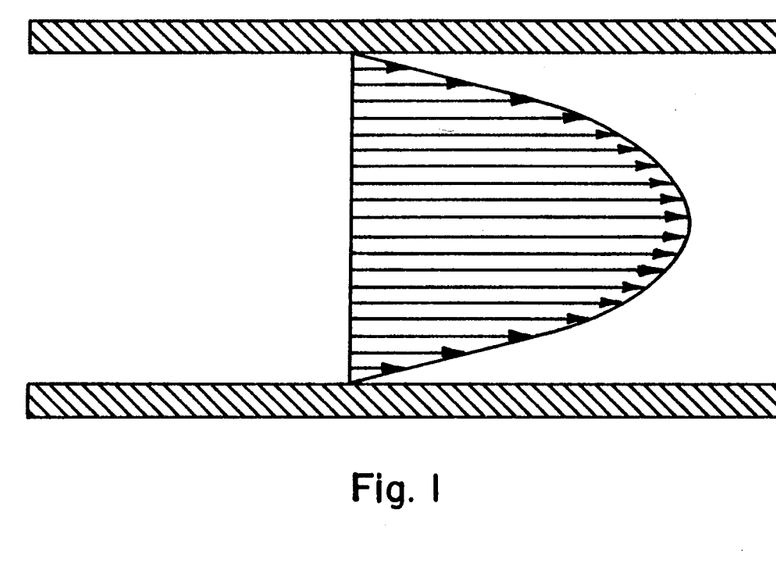
FIG. 1 is a illustration of fluid flowing in a conduit which forms a typical flow Newtonian flow pattern where the overall flow is something in the nature of a parabolic distribution of flow velocities wherein the velocity at the wall of the conduit is essentially zero and the velocity along the radius of the conduit increases to a maximum at the center.

Residence time distribution is therefore a means of expressing the various lengths of time that portions remain in the hydrolysis reaction zone. For example, consider the residence time distribution for the flow of a Newtonian type fluid, such as is illustrated in FIG. 1. Since a fluid portion near the wall will reside in the conduit for a substantially longer period of time that a portion in the center of the conduit, the residence time distribution will be fairly wide, as illustrated by curve A in FIG. 3, wherein the residence time is plotted against the percent flow. As a consequence, there will be a substantial number of portions of the cellulose acetate that are above and below the range of solubility of cellulose acetate in acetone and there will be a substantial quantity of undesirable precipitated masses which must be removed from the process. In contrast, as the number of portions of cellulose acetate which are above and below the solubility limits of cellulose acetate in acetone is reduced the horizontal component of the residence time distribution curve will become reduced and the curve will become "curve" as illustrated by curve B in FIG. 3. In contrast to a wide residence time distribution curve, illustrated by curve A, a narrower or "curve" curve, illustrated by curve B, would reduce the amount of cellulose acetate that is above and below the ranges of acetone solubility and eliminate or reduce the amount of undesirable precipitated masses which must be removed from the cellulose acetate process. As will be understood by those skilled in the art, the area under both curves is the same and represents 100 percent of the total flow of cellulose acetate per unit of time. Thus, if the residence time distribution curve could be altered from the typical pattern for Newtonian flow, illustrated by curve A, and made more narrow, illustrated by curve B, the amount of undesirable precipitated masses would be reduced or eliminated.

Figure 3:
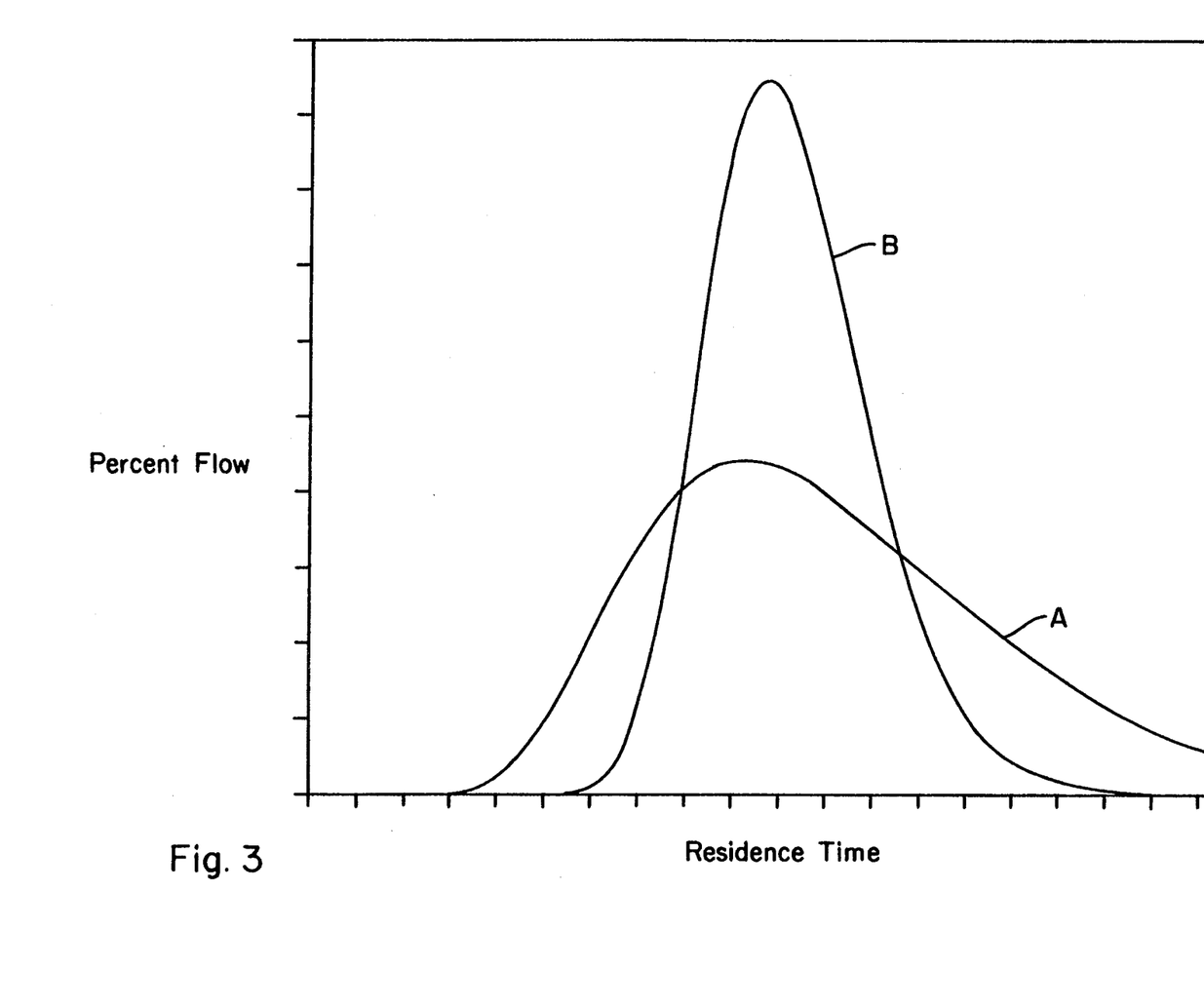

We have now discovered a continuous hydrolysis process which results in a narrow residence time distribution curve and a corresponding narrower range of acetyl distribution such as is depicted by Curve B in FIG. 3. Therefore, insoluble masses which precipitate out of a solution of cellulose acetate and acetone are reduced or eliminated.

Figure 4:
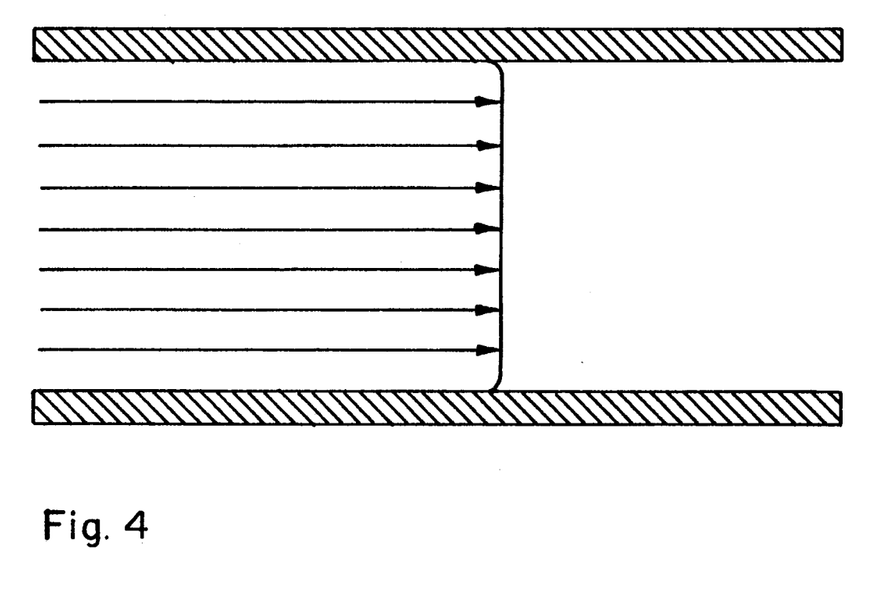
FIG. 4 is a illustration of fluid flowing in a conduit which does not form a typical Newtonian flow pattern but instead forms a "plug" type flow pattern wherein most of the portions of the moving fluid are moving at approximately the same velocity and, consequently, the radial velocity gradient is small.

We have accomplished the creation of a narrower spread of acetyl substitution by modifying the flew pattern of the composition undergoing hydrolysis from a Newtonian type flow pattern, such as depicted in FIG. 1, to a flow pattern wherein the radial velocity gradient is small compared to a Newtonian flow pattern, such as illustrated in FIG. 4. Thus, the flow pattern associated with this invention can be thought of as in the nature of a "plug" type flow pattern. As a result of a "plug" type flow pattern, most of the portions across the diameter of the composition moving through hydrolysis reactor move at more or less the same speed. As a result, most of the portions exit the hydrolysis reactor at the same time which results in less variation in the degree of substitution within each of the portions, a narrower residence time distribution and consequently fewer, if any, portions which are beyond the solubility limits of cellulose acetate in acetone and precipitate out as discrete masses.

Continuous hydrolysis processes which produce a variation of Newtonian flow are known in the art; however, continuous hydrolysis processes which achieve a plug type flow in accordance with this invention are not thought to be disclosed in the prior art. U.S. Pat. No. 2,790,796 discloses a hydrolysis process wherein plates having a triangular opening are disposed in the path of the cellulose acetate to create a flow pattern which deviates from a Newtonian flow pattern. U.S. Pat. No. 3,767,642 discloses a hydrolysis process which is conducted at a high temperature and involves multiple stages.

Processes which produce a plug type flow in a polymeric material are well known in the art. For example, it has been known for years that cellulose acetate can be colored by flowing the cellulose acetate and a colorant though a static mixer, often called an "in-line" mixer. Also, it is known that a plug type flow can be used in a polymerization reactor. For example, see *Chem. Eng. Comm.*, Vol. 36, pages 251–267.

We have caused the flow pattern to conform to a plug type flow pattern by reducing the difference in velocity across the radius of the mass of flowing cellulose acetate. Stated another way, in our invention the velocity gradient across the radius of the mass of flowing cellulose acetate is very small compared to the velocity gradient across the mass of flowing cellulose acetate in a conventional hydrolysis reactor.

The plug type flow associated with the process of this invention can be accomplished by the use of a variety of apparatus well known in the art which will sufficiently reduce the radial velocity gradient and create a plug type flow. For example, a static or in-line type mixer can be used. Suitable commercially available in-line mixers include models SMX, SMXL and SMX-B sold by Sulzer Brothers Limited and models KMOD-10, and KMOD-20, KMOD-60 sold by Chemineer Inc. Additionally, the flow pattern required for this invention can be created by use of conventional packing used in chemical process industry for distillation columns or gas-liquid scrubbers, such as Berl saddles or Raschig rings. A mechanically agitated mixer could be used if desired. Preferably, an in-line mixer is used because the absence of moving parts reduces production costs. Most preferably the in-line mixer is a model SMX sold by Sulzer Brothers Limited.

Figure 5:
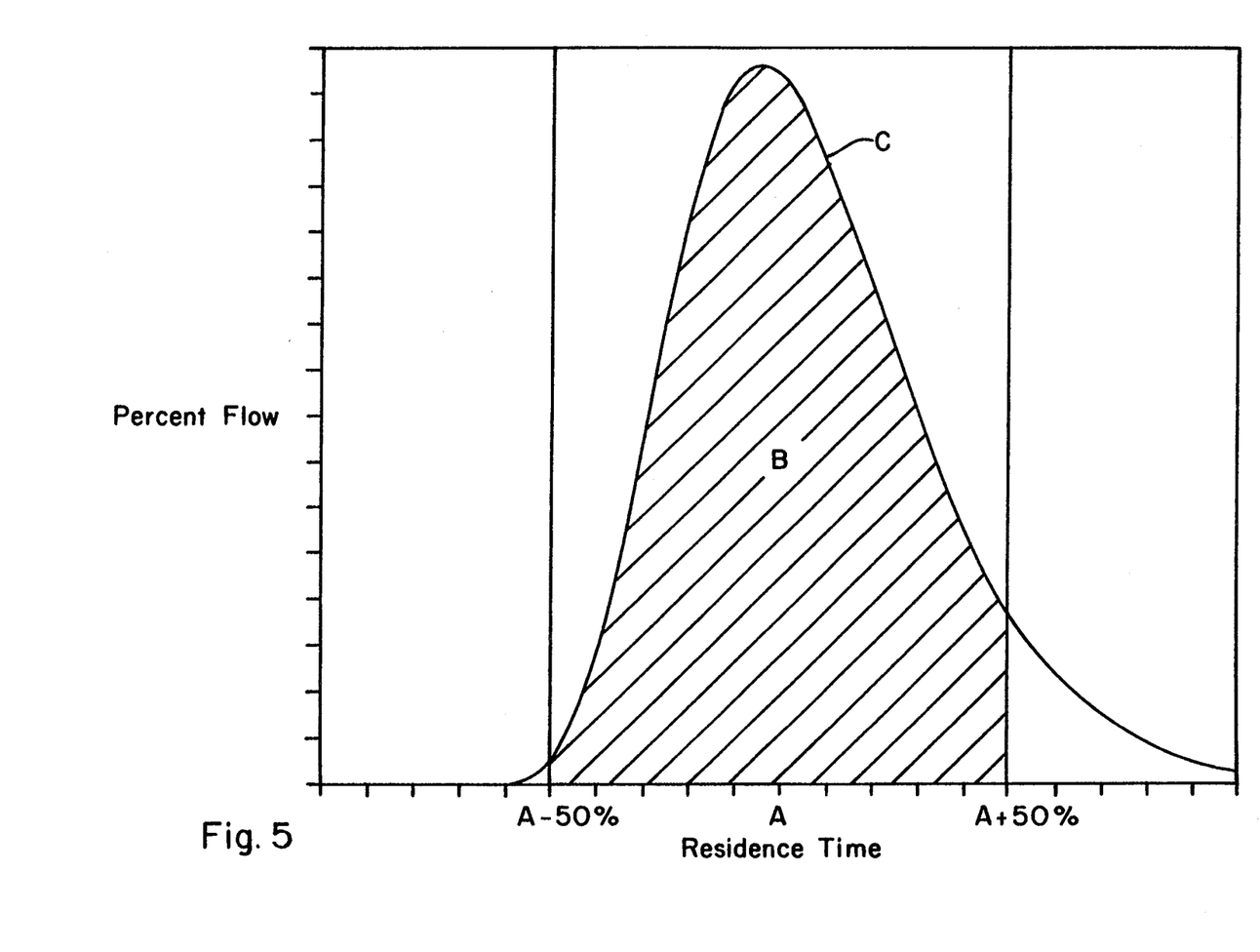
FIG. 5 is a plot of percent flow versus residence time and illustrates how the plug type flow of the process of this invention can be quantitatively expressed.

The plug type flow of the process of this invention can be quantitatively expressed by correlation of the residence times of the various portions versus the percent flow. Such a correlation is presented in FIG. 5 wherein the residence time has been plotted versus the percent flow to develop residence time distribution curve C. In accordance with the process of this invention, the composition flowing through the hydrolysis reactor achieves a residence time distribution such that 81%, preferably 90% and more preferably 95%, of the area under the residence time distribution curve is within plus or minus 50% of the mean residence time. In FIG. 5, the mean residence time has been identified as A. The area under curve C which is associated with plus or minus 50% of this value has been identified as B. Thus, in this invention, the area illustrated as B is at least 81% of the area under curve C.

Figure 6:
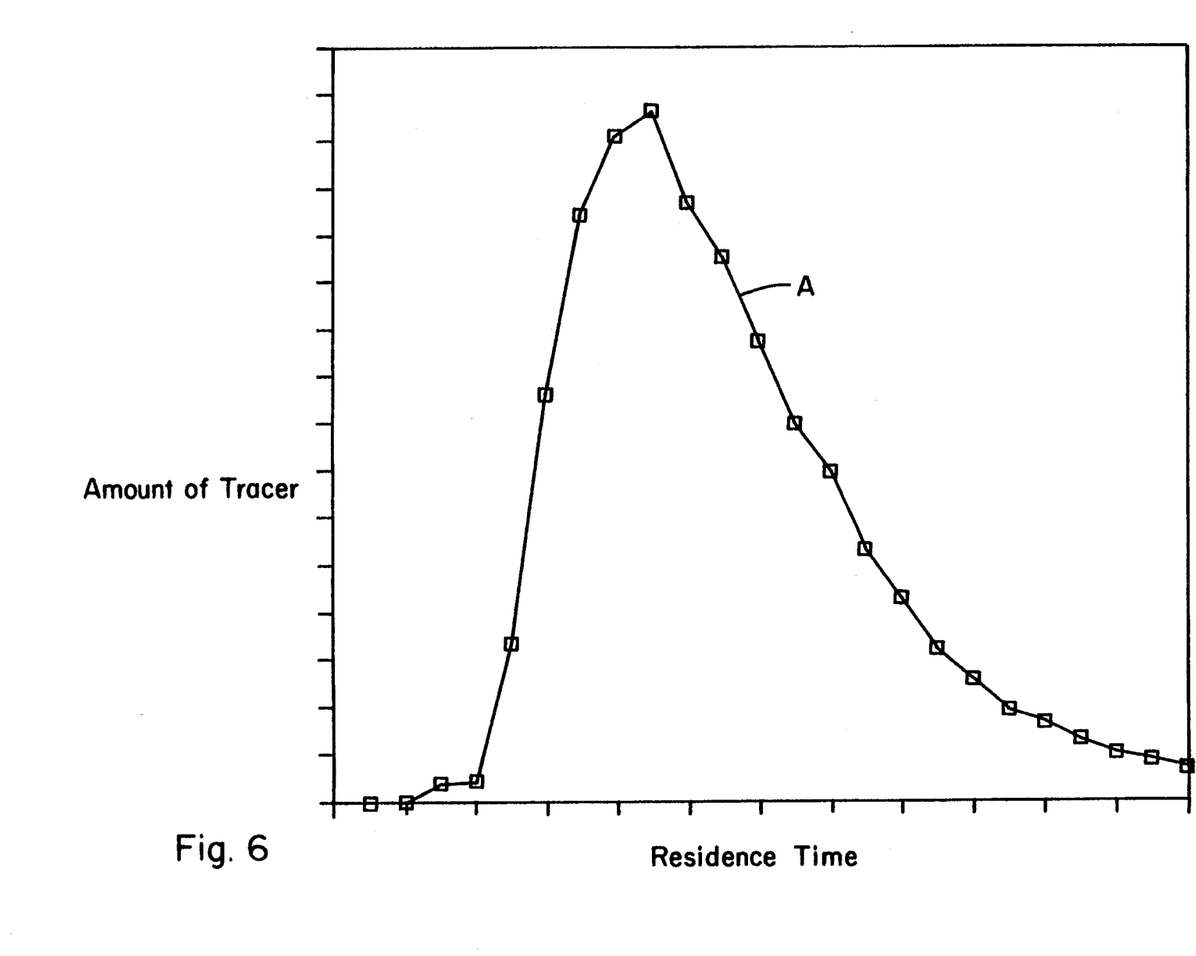
FIG. 6 is a plot of the amount of tracer versus the residence time and curve A represents a quantitative measurement of the residence time distribution.

Quantitative measurement of the residence time distribution is an important aspect of this invention. The residence time distribution can be measured by conducting a tracer test as the cellulose acetate flows through the hydrolysis reactor. In this test small quantities of a liquid tracer which is both miscible in the cellulose acetate and subsequently identifiable is injected at various positions across the diameter of the reactor for a short period of time which is not more than 5% of the residence time of the cellulose acetate into which the liquid is injected. The amount of tracer in the cellulose acetate which exits the hydrolysis reactor is determined for periodic sampling times. As illustrated in FIG. 6, the amount of tracer is then plotted versus the residence time and curve A is drawn.

The composition which is continually introduced into the hydrolysis reactor is broadly composed of cellulose triacetate in the range of 5 to 30%, water in the range of 4 to 25%, and acetic acid in the range of 45 to 91%. More specifically the composition is composed of cellulose triacetate in the range of 13 to 25%, water in the range of 7 to 20%, and acetic acid in the range of 55 to 80%. In a most preferred embodiment the composition is comprised of cellulose triacetate in the range of 13 to 22%, water in the range of 7 to 13%, and acetic acid in the range of 65 to 80%.

The composition that is continuously flowed through the hydrolysis zone can contain a mineral acid catalyst or can be essentially free of a mineral acid catalyst. In the embodiment wherein the composition is essentially free of a mineral acid catalyst a strong acid such as sulfuric acid can be used to catalyze the acetylation step and a neutralizing agent is contacted with the strong acid catalyst to neutralize the strong acid and create a pKa of the composition essentially the same as acetic acid. Example of neutralizing agents are sodium acetate, magnesium acetate and sodium hydroxide. The amount of neutralizing agent depends on the amount and type of the strong acid and amount and type of the neutralizing agent. These parameters can be selected by those ordinarily skilled in the art.

The temperature of the composition depends on whether the composition contains a catalyst. In the embodiment wherein the composition contains a mineral acid catalyst the temperature of the composition is broadly in the range of 40° C. to 80° C. In the embodiment wherein the composition is essentially free of a mineral acid catalyst the temperature of the composition is broadly in the range of 90° to 150° C.

The viscosity of the composition which is introduced into the hydrolysis zone is not critical and can vary widely depending on the particular process. In one preferred embodiment the viscosity can be above 5,000 centipoise, measured in accordance with ASTM D 2196.

The composition which is flowed to the hydrolysis zone can be formed in numerous ways well known in the art. In accordance with a preferred embodiment of the invention, the composition is formed in a two stage process wherein an admixture of the proper amount of cellulose triacetate and acetic acid to form the composition is admixed with 65 to 100% of the proper amount of water to form the composition as well as an amount of neutralizing agent to free the admixture of all strong mineral acid. The stream of cellulose triacetate and acetic acid can be admixed with the neutralizing agent and water in accordance with technique well know in the art.

In the second stage any remaining water needed to form the composition is added by conventional means, preferably by direct injection. Preferably the water is heated and most preferably is in vapor form.

The following example illustrates practice of the invention as well as the manner in which the mean residence time distribution is quantitatively determined.

First, the composition which is initially introduced into the hydrolysis reactor is prepared. This composition is prepared by admixing a 6.35 gallons per hour of a mixture of 19 weight parts cellulose triacetate, 4 weight parts water and 77 weight parts acetic acid and 1.27 gallons per hour of a mixture of 75 weight parts acetic acid, 20 weight parts water and 5 weight parts sodium acetate using a model SMX static mixer sold by Sulzer Brothers Limited. This admixture is composed of 16 weight % cellulose acetate, 7 weight % water, 77 weight % acetic acid, based on the combined weight of the cellulose triacetate, water and acetic acid. This admixture is then conducted through a heat exchanger to elevate the temperature of the admixture to about 104° C.

Figure 7:
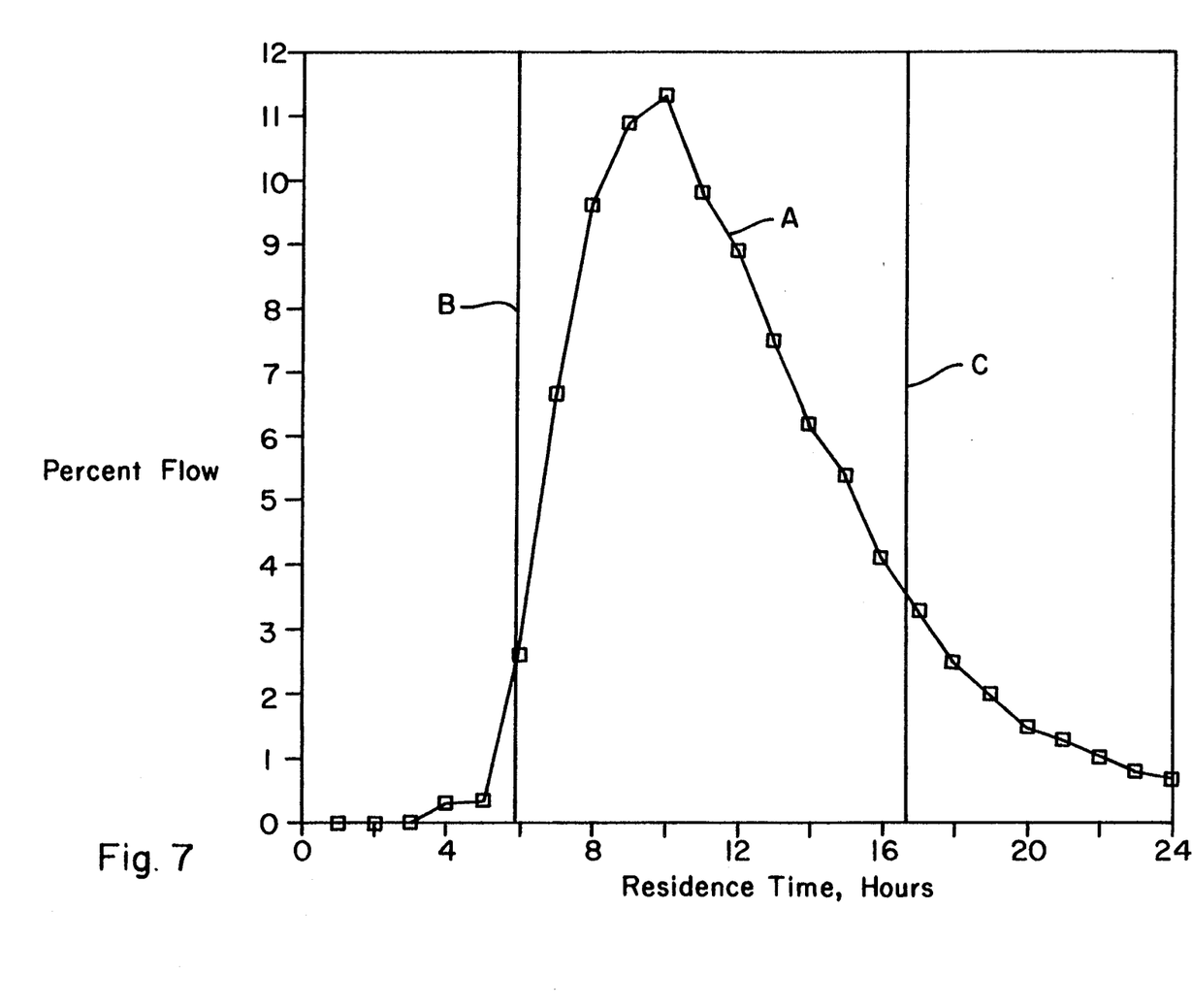
FIG. 7 is a plot of percent flow versus residence time and illustrates how the percent flow can be determined by determining using an experimental procedure. Using this experimental procedure a residence time distribution curve is developed by drawing curve A though the data points in FIG. 7. The residence time distribution is then investigated to determine the percentage of the area under the residence time distribution curve that is within plus or minus 50% of the mean residence time. In this investigation, the values of 50% more and 50% less than the residence time are determined and are illustrated as values B and C in FIG. 7. The area under the residence time distribution curve between the values of B and C is determined to be 81% of the total area under the residence time distribution curve.

After the initial composition is prepared it is introduced into a hydrolysis reactor. The hydrolysis reactor is model SMX static mixer sold by Sulzer Brothers Limited which is about 10 feet tall and 1 foot in diameter having conical heads. The heads are also equipped with the same type of static mixing elements as are located in the body of the reactor. The initial composition is continuously conducted through the column from the bottom up at a rate of 6.35 gallons per hour. After steady state flow is established through the static mixer, furfural is injected into the initial composition for one hour at the location where the initial composition enters the static mixer. The furfural is injected using a radially disposed conduit which discharges the furfural into the mass of cellulose acetate at the axis of the mixer. The composition then flows through a static mixer which thoroughly mixes the furfural across the cross section of the flowing mass of cellulose acetate. Beginning one hour after introduction of the furfural was initiated, and every hour for 32 additional hours, samples were taken of the composition flowing out the top of the static mixer. Each of these 33 samples was analyzed for parts per million furfural using UV Spectroscopy techniques. The mean residence time is then calculated by dividing the total volume of the hydrolysis reactor by the flow rate into the reactor. The percent flow is then determined by determining the amount of furfural in the sample divided by the total amount of furfural injected. The percent flow of each sample is then plotted versus the elapsed time since the furfural was injected. This plot is shown is FIG. 7. A residence time distribution curve is then developed by drawing curve A though the data points in FIG. 7.

The residence time distribution is then investigated to determine the percentage of the area under the residence time distribution curve that is within plus or minus 50% of the mean residence time. In this investigation, the values of 50% more and 50% less than the residence time are determined and are illustrated as values B and C in FIG. 7. The area under the residence time distribution curve between the values of B and C is determined to be 81% of the total area under the residence time distribution curve.

We claim:

1. A process comprising continuously flowing a composition through a hydrolysis zone so as to achieve a residence time distribution such that at least 81% of the area under the residence time distribution curve is within plus or minus 50% of the mean residence time, the composition initially comprising cellulose triacetate in the range of 5 to 30%, water in the range of 4 to 25%, and acetic acid in the range of 45 to 91%.

2. A process comprising continuously flowing a composition through a hydrolysis zone so as to achieve a residence time distribution such that at least 90% of the area under the residence time distribution curve is within plus or minus 50% of the mean residence time, the composition initially comprising cellulose triacetate in the range of 13 to 25%, water in the range of 7 to 20% and acetic acid in the range of 55 to 80%.

3. A process comprising continuously flowing a composition through a hydrolysis zone so as to achieve a residence time distribution such that at least 95% of the area under the residence time distribution curve is within plus or minus 50% of the mean residence time, the composition initially comprising cellulose triacetate in the range of 13 to 22%, water in the range of 7 to 13%, and acetic acid in the range of 65 to 80%.

* * * * *